(12) United States Patent
Lee

(10) Patent No.: US 7,009,925 B2
(45) Date of Patent: Mar. 7, 2006

(54) METHOD OF IDENTIFYING A TYPE OF OPTICAL DISC

(75) Inventor: Koang-ho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 10/145,583

(22) Filed: May 15, 2002

(65) Prior Publication Data

US 2002/0181371 A1 Dec. 5, 2002

(30) Foreign Application Priority Data

May 15, 2001 (KR) ................ 2001-26415

(51) Int. Cl.
*G11B 7/00* (2006.01)
(52) U.S. Cl. .................... 369/53.23
(58) Field of Classification Search ............ 369/53.23, 369/53.22, 53.2
See application file for complete search history.

(56) References Cited

U.S. PATENT DOCUMENTS

| | | | | |
|---|---|---|---|---|
| 5,966,357 A | * | 10/1999 | Ryoo | 369/53.23 |
| 6,052,344 A | * | 4/2000 | Ueki | 369/44.27 |
| 6,058,082 A | * | 5/2000 | Hwang | 369/44.27 |
| 6,141,307 A | * | 10/2000 | Yoshioka | 369/53.22 |
| 6,469,965 B1 | * | 10/2002 | Horita | 369/53.2 |

FOREIGN PATENT DOCUMENTS

| | | |
|---|---|---|
| JP | 10-334573 | 12/1998 |
| JP | 11353787 A | * 12/1999 |

\* cited by examiner

*Primary Examiner*—Brian E. Miller
*Assistant Examiner*—Peter Vincent Agustin
(74) *Attorney, Agent, or Firm*—Staas & Halsey LLP

(57) ABSTRACT

A method of identifying a type of optical disc, and more particularly, to a method of identifying a type of optical disc as a single-layer disc or a dual-layer disc, in which levels of high-frequency signals reflected from the optical disc are compared with reference values set according to the characteristics of the optical disc. The method of identifying the type of optical disc includes detecting a level of a predetermined first high-frequency signal from the optical disc and setting a predetermined reference value, detecting a level of a predetermined second high-frequency signal which is generated differently according to the type of the optical disc, and comparing the reference value with the level of a second high-frequency signal and identifying the type of the optical disc. The levels of high-frequency signals are compared with a reference value, and thus the optical disc is identified. Accordingly, data recorded on the optical disc is reproduced smoothly regardless of a difference in sensitivity of a pickup.

7 Claims, 2 Drawing Sheets

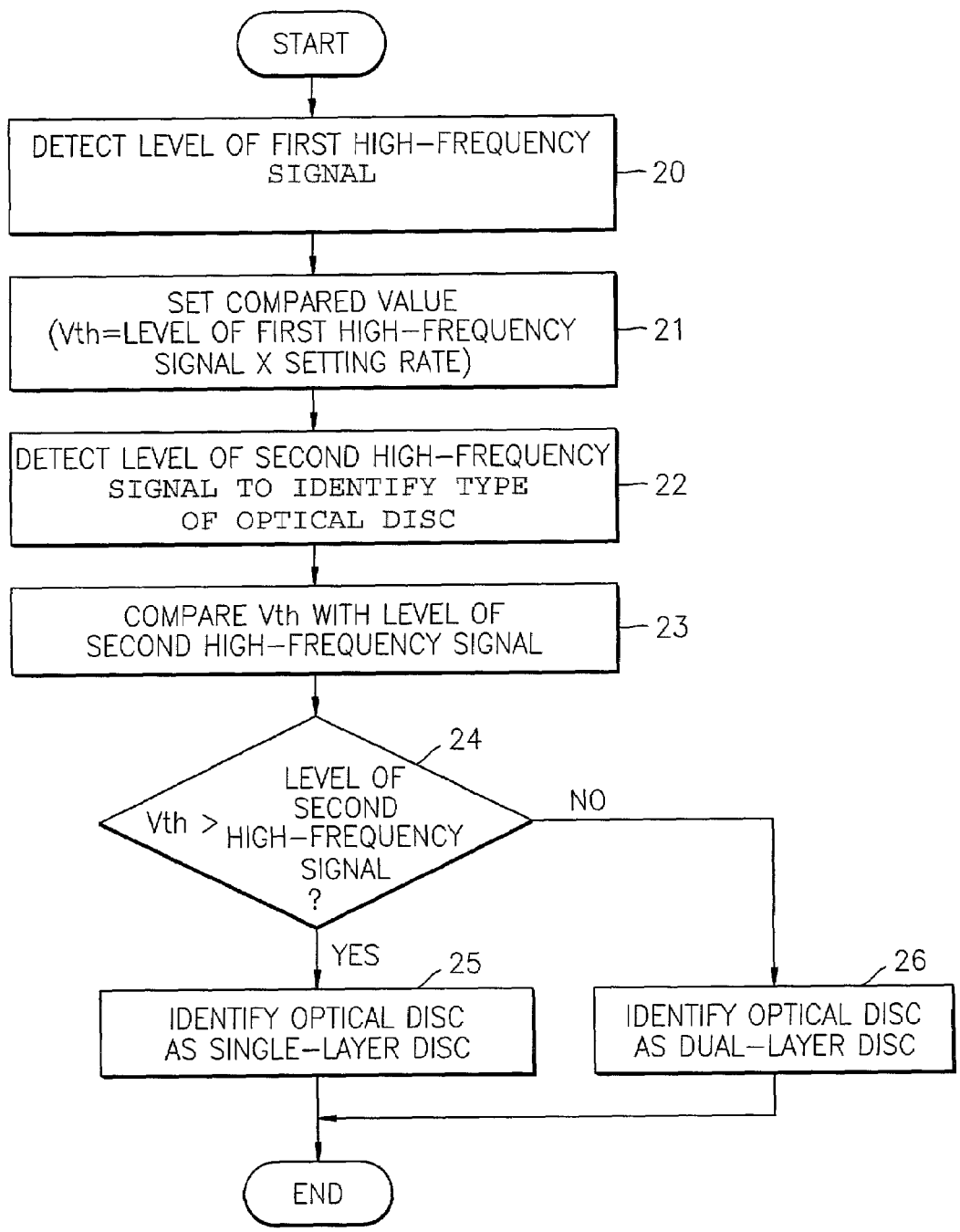

METHOD OF IDENTIFYING A TYPE OF OPTICAL DISC

CROSS-REFERENCE TO RELATED APPLICATIONS

This application claims the benefit of Korean Application No. 2001-26415, filed May 15, 2001, in the Korean Industrial Property Office, the disclosure of which is incorporated herein by reference.

BACKGROUND OF THE INVENTION

1. Field of the Invention

The present invention relates to a method of identifying a type of optical disc, and more particularly, to a method of identifying an optical disc as a single-layer disc or a dual-layer disc, in which levels of high-frequency signals reflected from the optical disc are compared with reference values set according to characteristics of the optical disc.

2. Description of the Related Art

In general, an optical recording medium such as a compact disc (CD) or digital versatile disc (DVD) has a diameter of several inches and a thickness of 1.2 mm, has a reflective surface as a data recording layer, and stores information such as sound, text, and graphics in the form of combinations of pits on the reflective surface. An optical recording medium has a capacity to store more data than a conventional floppy disc, which is a magnetic recording medium that may store roughly 2 megabytes of data. An apparatus to reproduce data recorded on an optical disc at ultrahigh-density at a high speed without any error in reading, has been developed with the development of ultrahigh-density optical discs. An apparatus to reproduce data recorded on various types of optical discs has been developed so that a user is not confined to use of a single type of optical disc.

In general, optical discs include CDs and DVDs, and DVDs include DVD-Ss and DVD-Ds. CDs include CDs for audio data and CDs for video and audio data. DVDs include DVD-Ss in which only one set of data is recorded in a track as a single layer, and DVD-Ds in which two sets of data are recorded in a track as a dual layer.

Conventionally, to distinguish between a single-layer disc and a dual-layer disc, an optical disc is identified as a dual-layer disc when predetermined (fixed) reference values are compared with and determined to be larger than levels of predetermined first and second high-frequency signals which are reflected from the disc. An optical disc is identified as a single-layer disc when predetermined (fixed) reference values are compared with and determined to be smaller than the levels of the predetermined first and second high-frequency signals which are reflected from the disc.

However, a reflection factor of the predetermined levels of the first and second high-frequency signals is lowered according to a difference in sensitivity of a pickup, which operates during reproducing data from an optical disc. As a result, it is difficult to accurately identify a type of optical disc, and thus it is difficult to smoothly reproduce data from the optical disc.

SUMMARY OF THE INVENTION

Accordingly, it is an object of the present invention to provide a method of identifying a type of optical disc, in which levels of high-frequency signals reflected from the optical disc are compared with reference values set according to characteristics of the optical disc.

Additional objects and advantages of the invention will be set forth in part in the description which follows and, in part, will be obvious from the description, or may be learned by practice of the invention.

The foregoing and other objects of the present invention are achieved by providing a method of identifying a type of optical disc. The method includes detecting a level of a predetermined first high-frequency signal from the optical disc and setting a reference value, detecting a level of a predetermined second high-frequency signal which is generated differently according to the type of the optical disc, and comparing the reference value with the level of the second high-frequency signal and identifying the type of the optical disc.

According to an aspect of the invention, the setting of the reference value includes an arithmetic operation on the first high-frequency signal and a predetermined setting rate, and the setting rate is differently set according to the characteristics of the optical disc.

According to an aspect of the invention, the optical disc is identified as a single-layer disc when the reference value is larger than the level of the second high-frequency signal, and the optical disc is identified as a dual-layer disc when the reference value is smaller than the level of the second high-frequency signal.

BRIEF DESCRIPTION OF THE DRAWINGS

The above and other objects and advantages of the invention will become apparent and more appreciated from the following description of the preferred embodiments, taken in conjunction with the accompanying drawings of which:

FIG. 2 is a flow chart illustrating a method to identify the type of optical disc, according to an embodiment of the present invention.

DETAILED DESCRIPTION OF THE PREFERRED EMBODIMENTS

Figure 1:
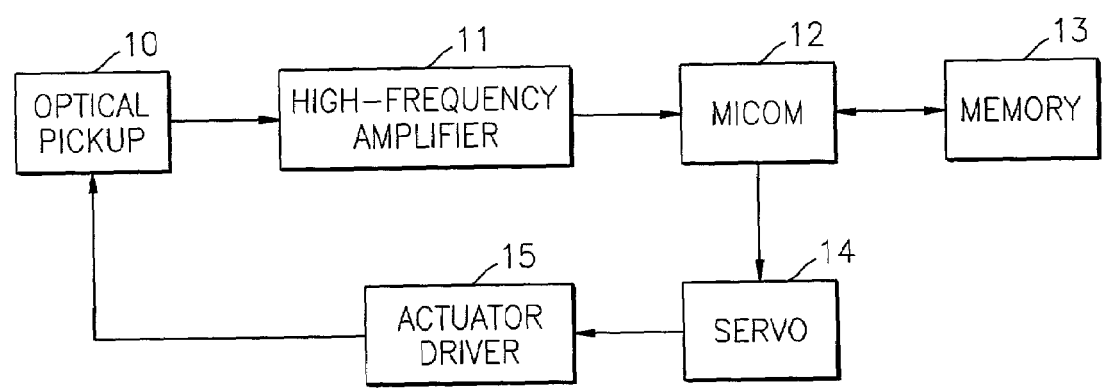
FIG. 1 is a block diagram of an apparatus to identify a type of optical disc according to an embodiment of the present invention.

Reference will now be made in detail to the present preferred embodiment of the present invention, examples of which are illustrated in the accompanying drawings, wherein like reference numerals refer to like elements throughout.

FIG. 1 is a block diagram of an apparatus to identify a type of optical disc. Referring to FIG. 1, the apparatus includes an optical pickup 10, a high-frequency amplifier 11, a microcomputer (MICOM) 12, a memory 13, a servo 14, and an actuator driver 15.

FIG. 2 is a flow chart illustrating a method of identifying the type of optical disc. The flow chart shown in FIG. 2 includes detecting a level of a predetermined first high-frequency signal (operation 20), performing an arithmetic operation on the detected level of the first high-frequency signal and a predetermined setting rate, and thereby setting a reference value (operation 21). The method further includes detecting a level of a predetermined second high-frequency signal to identify the type of optical disc (operation 22), comparing the reference value with the level of the second high-frequency signal (operation 23), determining whether the reference value is larger than the level of the second high-frequency signal (operation 24), and identifying the optical disc as a single-layer disc (operation 25) or as a dual-layer disc (operation 26).

Herein below, the present invention is described in detail with reference to FIGS. 1 and 2.

In FIG. 1, the optical pickup 10 scans light on the optical disc stacked in the apparatus to reproduce data recorded on the optical disc, detects a quantity of reflected light according to a presence of pits formed on a recording surface of the optical disc, and detects information recorded on the optical disc. Accordingly, the optical pickup 10 includes a plurality of optical sensors and analyzes information by synthesizing signals detected by each of the optical sensors.

The high-frequency amplifier 11 synthesizes a plurality of high-frequency signals detected by the optical pickup 10, amplifies the synthesized signals to a level appropriate for signal processing, and transmits the synthesized and amplified high-frequency signals to the MICOM 12. Different amplified high-frequency signals are output according to the type of optical disc.

The MICOM 12 controls a system according to a predetermined program stored in the memory 13, receives the high-frequency signals output from the high-frequency amplifier 11, identifies the type of optical disc, and controls the servo 14 accordingly. The memory 13 stores the program to be performed by the MICOM 12.

It is understood that the MICOM 12 can be implemented using a computer, and that the method shown in FIG. 2 can be implemented using a computer program encoded on a computer readable medium to be executed by the computer.

The servo 14 controls a driving state of a servo mechanism according to the control of the MICOM 12. In particular, the servo 14 outputs a focus-adjusting signal to control a focusing state of signals reproduced by the optical pickup 10 according to a control signal transmitted from the MICOM 12. The actuator driver 15 controls a position of the optical pickup 10 according to the focus-adjusting signal output from the servo 14 and thereby, adjusts an interval between the optical pickup 10 and the optical disc.

A method of identifying the type of an optical disc implemented by the MICOM 12, is described as follows. The high-frequency amplifier 11 outputs different high-frequency signals according to the type of optical disc. When the optical disc is a single-layer disc, a high-frequency signal having one peak value is output. When the optical disc is a dual-layer disc, a high-frequency signal having two peak values is output.

In operation 20, the level of a predetermined first high-frequency signal among a plurality of high-frequency signals received from the optical disc, is detected from the high-frequency amplifier 11. The level of the first high-frequency signal which is first detected regardless of the type of optical disc, is detected from the high-frequency amplifier 11.

In operation 21, the arithmetic operation is performed on the detected level of the first high-frequency signal and the predetermined setting rate, thereby setting a reference value. The level of the first high-frequency signal is multiplied with the predetermined setting rate, and thus the reference value is set. The predetermined setting rate is set differently according to characteristics of the optical disc (e.g., according to specifications which vary according to a material of an optical disc). According to the present invention, the setting rate is assumed to be $$\frac{1}{4}.$$

In operation 22, the level of a predetermined second high-frequency signal among the plurality of high-frequency signals received from the optical disc, is detected from the high-frequency amplifier 11 to identify the type of optical disc. The level of the second high-frequency signal which is detected regardless of the type of optical disc, is detected from the high-frequency amplifier 11. When the optical disc is a dual-layer disc, the level of the second high-frequency signal is detected. When the type of the optical disc is a single-layer disc, the level of the second high-frequency signal is not detected. Although the level of the second high-frequency signal is detected, the second high-frequency signal may be noise.

In operation 23, the reference value is compared with the level of the second high-frequency signal. In operations 24 and 25, the optical disc is identified as a single-layer disc if the reference value is determined to be larger than the level of the second high-frequency signal. For example, when the level of the first high-frequency signal is 100 and the level of the second high-frequency signal is 10, the reference value is 25

$$\left(e.g., 25 = 100 \times \frac{1}{4}\right).$$

Accordingly, the optical disc is identified as a single-layer disc because the reference value is larger than the level of the second high-frequency signal.

In operations 24 and 26, the optical disc is identified as a dual-layer disc if the reference value is determined to be smaller than the level of the second high-frequency signal. For example, when the level of the first high-frequency signal is 100 and the level of the second high-frequency signal is 50, the reference value is 25

$$\left(e.g., 25 = 100 \times \frac{1}{4}\right).$$

Accordingly, the optical disc is identified as a dual-layer disc because the reference value is smaller than the level of the second high-frequency signal.

As described above, the levels of high-frequency signals reflected from the optical disc are compared with a reference value which is set differently according to the characteristics of the optical disc. The optical disc is thereby identified and enables data recorded on the optical disc to be reproduced smoothly regardless of a difference in sensitivity of a pickup.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of identifying a type of optical disc, the method comprising:

detecting a level of a predetermined first high-frequency signal from the optical disc and setting a reference value based upon the detected level of the first high-frequency signal;

detecting a level of a predetermined second high-frequency signal which is generated differently according to the type of the optical disc; and comparing the reference value with the level of the second high-frequency signal and identifying the type of the optical disc, wherein the setting of the reference value includes performing an arithmetic operation on the first high-frequency signal and a predetermined setting rate which is set differently according to characteristics of the optical disc.

2. The method of claim 1, wherein the identifying of the optical disc comprises:

identifying the optical disc as a single-layer disc when the reference value is larger than the level of the second high-frequency signal, and the optical disc is identified as a dual-layer disc when the reference value is smaller than the level of the second high-frequency signal.

3. An apparatus to identify an optical disc, comprising:

a detecting unit to detect a level of a first high-frequency signal, and to detect a level of a second high-frequency signal which is generated differently according to the type of the optical disc;

a setting unit to set a reference value for the optical disc based upon the detected level of the first high-frequency signal; and a comparing unit to compare the reference value with the level of the second high-frequency signal and identifying the type of the optical disc, wherein the setting unit sets the reference value by performing an arithmetic operation on the first high-frequency signal and a predetermined setting rate which is set differently according to characteristics of the optical disc.

4. The apparatus according to claim 3, wherein, based upon said comparison, the optical disc is identified as a single-layer disc when the reference value is larger than the level of the second high-frequency signal, and is identified as a dual-layer disc when the reference value is smaller than the level of the second high-frequency signal.

5. A computer readable medium for identifying a type of optical disc according to the method of:

detecting a level of a predetermined first high-frequency signal from the optical disc and setting a reference value based upon the detected level of the first high-frequency signal;

detecting a level of a predetermined second high-frequency signal which is generated differently according to the type of the optical disc; and comparing the reference value with the level of the second high-frequency signal and identifying the type of the optical disc, wherein the setting of the reference value includes performing an arithmetic operation on the first high-frequency signal and a predetermined setting rate which is set differently according to characteristics of the optical disc.

6. The computer readable medium according to claim 5, wherein the identifying of the optical disc comprises:

identifying the optical disc as a single-layer disc when the reference value is larger than the level of the second high-frequency signal, and the optical disc is identified as a dual-layer disc when the reference value is smaller than the level of the second high-frequency signal.

7. An apparatus to identify a type of optical disc, comprising:

a detecting unit to detect a first high-frequency signal from the optical disc; and a setting unit to set a reference value for the optical disc based upon the detected level of the first high-frequency signal, wherein said detecting unit further detects a second high-frequency signal and thereby, compares the reference value and the second high-frequency signal to identify the type of optical disc, wherein the setting unit sets the reference value by performing an arithmetic operation on the first high-frequency signal and a predetermined setting rate which is set differently according to characteristics of the optical disc.

* * * * *